United States Patent [19]

Gordon

[11] 4,236,794
[45] Dec. 2, 1980

[54] SELF-FOCUSING CAMERA APPARATUS AND METHOD

[76] Inventor: Gary B. Gordon, 21112 Bank Mill Rd., Saratoga, Calif. 95070

[21] Appl. No.: 17,448

[22] Filed: Mar. 5, 1979

Related U.S. Application Data

[63] Continuation-in-part of Ser. No. 901,564, May 1, 1978, Pat. No. 4,152,061.

[51] Int. Cl.³ ............................................. G03B 3/10
[52] U.S. Cl. ................................. 354/25; 352/140; 354/81; 354/195; 358/227
[58] Field of Search ................. 354/25, 81, 195; 352/140; 358/227; 355/56

[56] References Cited

U.S. PATENT DOCUMENTS 3,847,474  11/1974  Uterhart ..................... 354/195 X

*Primary Examiner*—Michael L. Gellner
*Attorney, Agent, or Firm*—A. C. Smith

[57] ABSTRACT

A method and apparatus are provided which automatically focus a television camera or motion picture camera, or the like, in applications where, for any given camera-pointing direction, the desired subject will lie at a single-valued and predetermined distance from the camera such as on a planar surface. In one embodiment, a mechanical linkage enables a camera, shooting downward onto a flat playing field, to self-focus on any point in that field. In an electronic embodiment, a learn mode is included that handles events on more complicated terrains such as mountainous terrain in skiing events. In these cases, the self-focusing action is instantaneous, continuous and accurate.

5 Claims, 7 Drawing Figures

SELF-FOCUSING CAMERA APPARATUS AND METHOD

CROSS-REFERENCE TO RELATED APPLICATION

This is a continuation-in-part application of pending application Ser. No. 901,564, entitled SELF-FOCUSING CAMERA APPARATUS AND METHOD, filed May 1, 1978, by G. B. Gordon, now U.S. Pat. No. 4,152,061.

BACKGROUND OF THE INVENTION

It is desirable that cameras used for photographing action events be as automatic as possible in order to free the cameraman to concentrate on picture composition. Ideally, the cameraman should only have to concern himself with the subjective element of framing (pointing and zooming) and not the more objective elements of focusing and exposure.

Focusing is not a significant problem at events which occur in daylight since the lens aperture may be reduced to the point where the depth of field is adequate. Focusing is a significant problem, however, at indoor or night events where low light levels necessitate using large lens apertures, particularly if color fidelity is to be maintained. Such apertures produce shallow depths-of-field and necessitate careful and frequent refocusing. As the lens is zoomed to increase image size the focusing becomes even more critical. A further problem is that when an image is slightly out of focus, it is difficult to determine whether focusing is long or short without a trial-and-error procedure. Thus, a cameraman usually experiences difficulty shooting an action sequence under artificial lighting conditions with tight framing and acceptable maintenance of focus.

Focusing aids such as split-image and microprism rangefinders are seldom employed in action photography because they are too slow. A partial solution to the problem is to establish focus presettings which may be selected by buttons or stops associated with certain frequently used distance settings. One button could be preset, for example, to the distance to a hockey goal. Focus presets were developed, however, for use in staged studio applications where subjects are located at only a few specific fixed distances, and are of little use in sports photography where sharp focusing is required over a continuum of focal distances.

Autofocusing devices for still cameras are disclosed in the literature (see, for example, U.S. Pat. Nos. 3,538,830 through 3,538,833; 3,572,230; and 3,730,068). Devices of this type commonly reference to a pendulum, and assume that the photographer is standing on the same baseline as the subject. They require that he momentarily point the camera at the subject's feet before each shot to achieve focus. This deframing procedure and the oscillations of the undamped pendulum induced by slewing the camera preclude its application in motion photography.

Other known autofocusing devices recognize that, for cameras situated outside the plane of the subject, focusing information can be derived from knowledge of the lens focal length, height of the camera, and angle by which the camera is pointed below the horizon (see, for example, U.S. Pat. No. 2,456,317). To solve this equation which has three variables, interchangeable three-dimensional cams are used. However, these cams are difficult to manufacture and are difficult to mount for proper tracking in the camera stand.

SUMMARY OF THE INVENTION

In accordance with the present invention, camera focus is automatically derived from knowledge of the direction in which the camera is pointed in conjunction with the condition that, for any camera-pointing angle of interest, the subject is located at a single-valued distance from the lens. This condition is satisfied, for example, when events are viewed from an elevated position above a planar field but, of course, is not satisfied when such events are viewed from within the plane of the field (i.e., from ground level).

In one embodiment of the present invention, camera-focusing operation is optimized for the case of shooting from high camera elevations, such as at sports events or the like which take plce on level, plane surfaces. Such events include those taking place on fields, tracks, arenas, rinks, pools, and courts. Under such conditions, only the camera declination angle is required to derive proper focus, since the camera azimuth angle is not a factor.

The focusing motion of the lens may be derived mathematically from the declination angle ($\phi$) and the height (H) of the camera above the object. First, the lens-to-subject distance $(d_o) = H/\sin\phi$. The required shift (s) of the camera lens from its infinity position can in turn be derived from $d_o$. Specifically, $$s = \{F/[1-(F/d_o)]\} - F,$$

where F is the focal length of the camera lens. Combining equations, then, the required lens shift necessary to achieve focus, as a function of declination angle $\phi$, is:

$$s = \{F/[-(F\sin\phi)/H]\} - F,$$

where F and H are constant for a given camera and location.

The ratio of lens focal length to camera height, F/H, is generally a very small number of the order of 0.01. To this extent that $F << H$, the lens-shift equation can thus be simplified to $$s = (F^2/H)\sin\phi,$$

or a simple constant times the sine of the declination angle. Many methods exist for extracting a quantity substantially proportional to the sine of an angle. For instances where the angles involved are small, the angle itself may even be used as a close approximation to its sine.

In one embodiment of the present invention, this equation is implemented using mechanical linkage which converts the declination angle $\phi$ to linear motion proportional to its sine by a mechanism connected to the tilt-head of the camera tripod or to an artificial level. This linear motion is then used to shift the camera lens to effect focusing, and also to rotate the focusing handle in order to provide feedback to the cameraman.

It is desirable that the operator be able to override such an autofocusing feature in certain instances, such as when swinging the camera upwards to pick up a scoreboard.

In practice, it is not necessary to know the numerical values ot the lens focal length and camera height. Rather, it is sufficient to include a control knob that adjusts the gain of the mechanical linkage which converts the angular motion into focusing motion of the lens. The use of this adjustment is described shortly.

With the present invention, a set-up procedure for a camera simply requires leveling the tripod, checking the tracking at infinity (and adjusting if necessary), and finally focusing on one point in the field using such a gain-control knob. Once this knob is set to achieve focus on one point in the field, focusing for all other points in the field will be achieved automatically, whether the camera is pointed horizontally, straight down, or to any point in-between. The present invention is thus well suited for level playing fields due to the simplicity of the equation relating the lens shift to the camera declination angle, and the subsequent ease with which the equation can be implemented.

A second embodiment of the present invention is well suited for the practical demands of heavy television cameras. This embodiment is more elaborate and emphasizes reliability and convenience of installation.

Modern pan-tilt heads for such cameras tilt the cameras on cam rollers, about axes that are virtual rather than physical. This presents minor practical problems in sensing the angle of declination. Further, sports cameras are frequently transported and the lens, camera body, tilt head, and tripod are usually cased separately. The present focuser does not impede this disassembly and even enables heads and cameras to be intermixed.

The autofocuser of this embodiment is packaged as a compact self-contained module that is physically attached only to the lens.

The angle of declination of the camera below the horizon is sensed relative to an artificial level for convenience. Practical artificial levels employ gravitational vertical sensing and damping, and those suitable for this purpose include gyroscopic horizons, electrolytic levels, and damped pendulums.

The aforementioned $s=(F^2/H) \sin \phi$ equation is implemented electronically rather than mechanically in this embodiment of the invention which uses synchros and AC servomotors for superior reliability.

In a third embodiment of the present invention, the more complicated relationship between lens shift and the direction in which the camera is pointed during shooting of an event over varying terrain, such as a skiing event, is determined electronically using previously-stored focus information.

In this embodiment, the focusing information is stored for each angular direction of the lens as data contained in a look-up table of values of lens shifts which correspond to camera-pointing directions. The table may be generated on-site before an event by pointing the camera at points along the path of the event, focusing manually at each point, and electronically storing the resulting data. In use, then, the lens-shift data corresponding to the direction in which the camera is currently pointed is derived from the look-up table and may even be interpolated if desired between stored data points. In this embodiment, angle transducers are disposed on the aximuth and declination axes of the tile head. The declination angle may be referenced to an artificial level and an electronic controller such as a microprocessor, and a lens-focusing servo are arranged to control focus as the camera tracks an object along the course from which the focusing data was previously derived.

DESCRIPTION OF THE PREFERRED EMBODIMENTS

Figure 1:
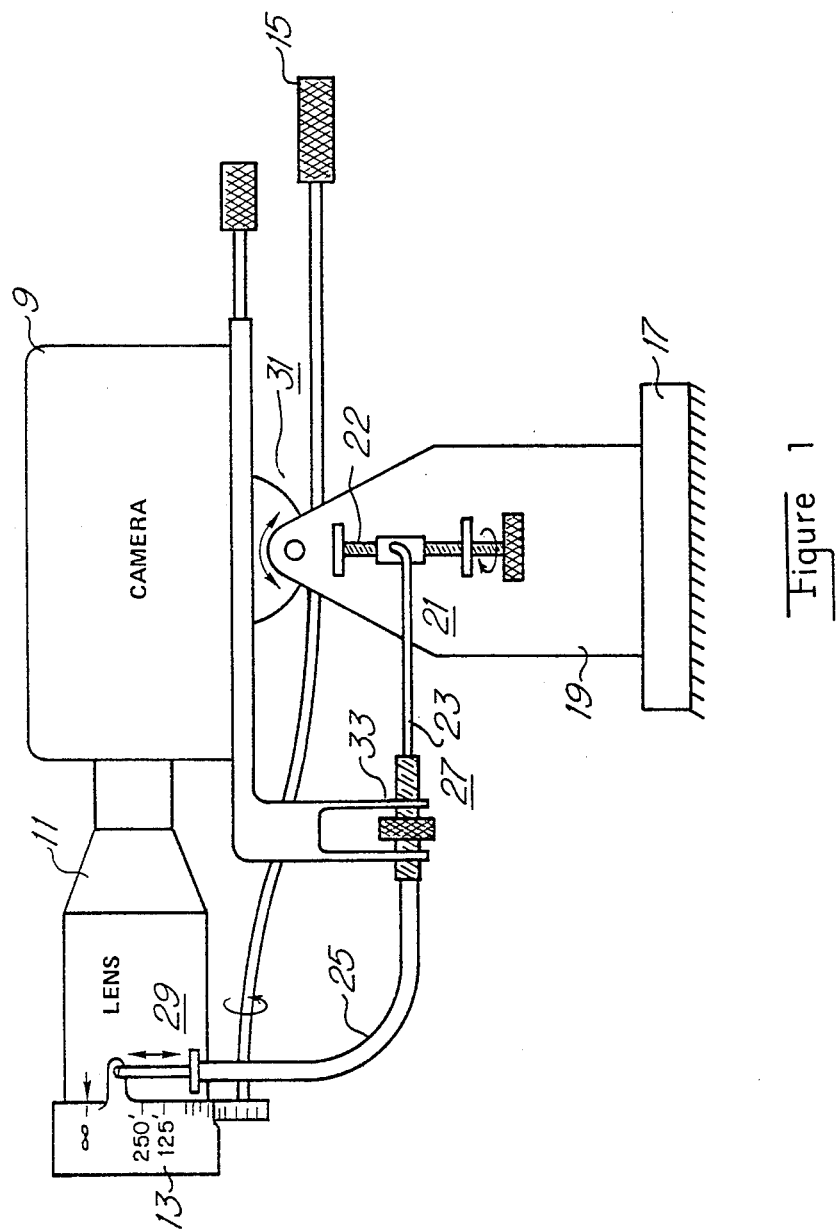
FIG. 1 is a drawing of an autofocusing camera according to one embodiment of the present invention.

Referring now to FIG. 1, there is shown a mechanical embodiment of an autofocusing camera. The basic camera 9 may be a photographic or television camera with a focus-adjustable lens 11 of the type that is rotatable about the optical axes using a focusing ring 13 which may be gear-driven from a focusing handle 15. The support 17 may comprise a tripod (not shown) or the like, and the tilt head base 19 is disposed on top of the support 17. The autofocusing apparatus includes the sine pick-off assembly 21, the push-rod 23 and sheath 25 assembly which transmits the focus-control motion to the lens-focusing ring 13, the infinity adjust knob 27, and the focusing-ring drive assembly 29.

The sine pick-off assembly generates push-rod motion 23, 25 closely proportional to the sine of the angle by which the camera is declined below the horizon. The constant of proportionality must be adjusted by rotating the lead screw 22 to set the push-rod 23 at a selectable distance from the pivot 31. This adjustment facilitates changes of lenses, or camera height.

The push-rod motion 23 thus generated by the sine pick-off is coupled to the lens 11 for rotating the focusing ring 13. The effective length of the push-rod can be varied in order to adjust tracking at infinity focus, if ever necessary, by the use of infinity adjustment knob 27. This knob is threaded onto the push-rod sheath 25, which in turn passes freely through a hole in the tilt-head platform 33 for lateral adjustment in and out of the end of sheath 25 relative to the sine pick-off assembly 21.

Spring coupling, or the like, should be used to allow the operator to override the autofocusing feature, as well as to prevent excessive stresses on the linkage if the camera is pointed above the horizon.

To simplify the mechanical linkage in this embodiment, two additional approximations have been made. One is that the distance from the infinity adjustment knob assembly 27 to the sine pick-off 21 is sufficiently greater than the distance from the sine pick-off 21 to the pivot 31 that the resultant motion of the push-rod closely generates the sine of the declination angle. The second approximation is that the rotation of the focusing ring is less than 20° or 30°, so that linear motion of the push-rod is proportionally translated into angular rotation of the ring. These approximations are easily enough met in practice and result in a considerable simplification of the required mechanical linkage.

In operation of the autofocusing camera, the camaraman first levels the tripod. He next points the camara horizontally toward the horizon, and uses the infinity adjust knob 27 to insure that the lens-focusing ring 13 indicates infinity focus. He then tilts the camera downward to pick up an object lying in the plane of the playing field, and focuses on it using the lead-screw knob of the sine pick-off assembly. Focusing will then be automatically achieved for all other points in the field.

Figure 2:
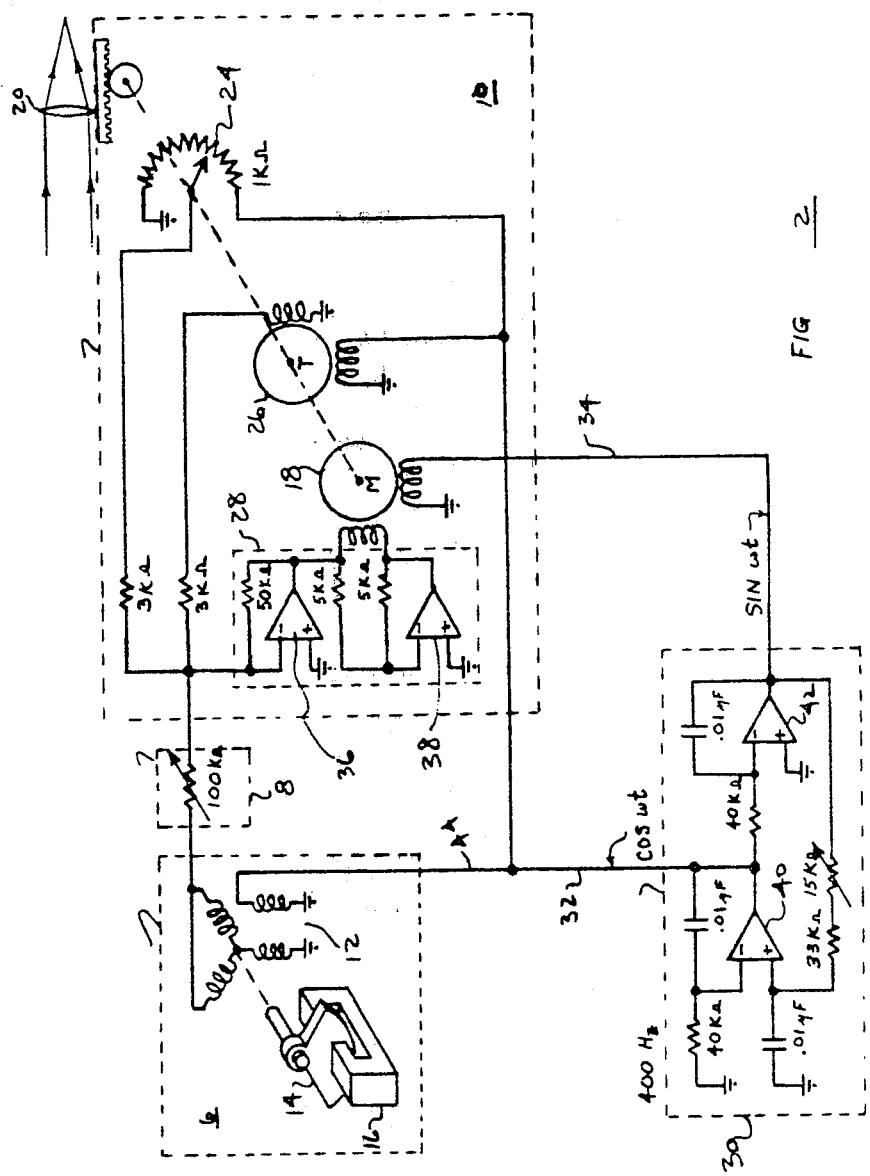
FIG. 2 is a schematic diagram of an electronic embodiment of the present invention.

Referring now to FIG. 2, there is shown an electronic embodiment of a continuous autofocuser suited for use on large television cameras shooting from fixed positions downwardly onto horizontal playing fields, or, alternatively, from a vehicular or airborne platform at a variable, known elevation. This embodiment provides enhanced convenience over the previously described mechanical embodiment. This embodiment includes a declination pointing direction sensor and sine converter 6 whose output is scaled by a camera-height adjusting potentiometer 8 whose output in turn sends the focusing command to the lens servo 10.

Declination pointing direction sensing and sine extraction are both accomplished by assembly 6. The synchro control transformer 12 develops an AC signal across its stator winding with an amplitude that is proportional to the sine of the angle of rotation of its housing relative to its shaft. Its housing is fixed in rotation relative to the camera body, and its shaft carries the pendular horizontal reference 14. A brushless (or hairspring) style of synchro control transformer (for example, a commercial unit available from Clifton Precision) is desirable to minimize frictional errors. For small declination angles, the synchro control transformer 12 may be replaced by a conventional linear transformer to produce an output proportional to the angle of declination.

Pendular level references require care in application, where the pendulum cannot be located at the intersection of the pan and tilt axes. Panning and tilting will then deflect the apparent vertical from the true vertical. However, owing to the massiveness of television cameras and the smoothness of motion typical of skilled operation, the distortion of the apparent vertical can be held within acceptable limits. Further, the distortion that does occur can be rendered transitory using good pendulum design. Specifically, the pendulum should be short so that its natural period falls high above the perturbational frequencies likely to be encountered in the camera movement, and the pendulum should be damped. Damping is accomplished by the permanent magnet 16 which induces eddy-currents in the conductive pendulum 14 as one form of dynamic braking or damping.

It should be noted that other gravity-sensitive artificial levels may be substituted. Where extreme accuracy is desired, gyroscopic horizons that are available as modular navigational components may be used. Intermediate performance may be obtained through the use of servo-stabilized electrolytic-vial level-sensors of the type conventionally available.

Returning to FIG. 2, the output of the transformer 12 is scaled electronically by the potentiometer 8 to accommodate the scaling factor $F^2/H$ indicative of the height of the camera. This adjustment need be made only once during initial camera set-up. Of course, the scaling potentiometer may alternatively be connected in line 44.

The scaled output from the potentiometer 8 is used to position the lens via servo 10 and associated linkage. An AC, two-phase servomotor 18 positions the lens 20. Position and velocity feedback signals are obtained from potentiometer 24 and tachometer 26, respectively. They are summed with the focus command signal from the height potentiometer 8 and any error signal resulting is amplified by servo amplifier 28 for application to the motor 18.

A simple 400 Hz inverter 30 may be provided to derive AC power from the DC voltages commonly available in television cameras. This inverter 30 develops the quadrature signals 32, 34 necessary to operate the control systems of this type.

The four power operational amplifiers 36, 38, 40, 42 may be conventional components, for example, Fairchild Type uA759.

Figure 3:
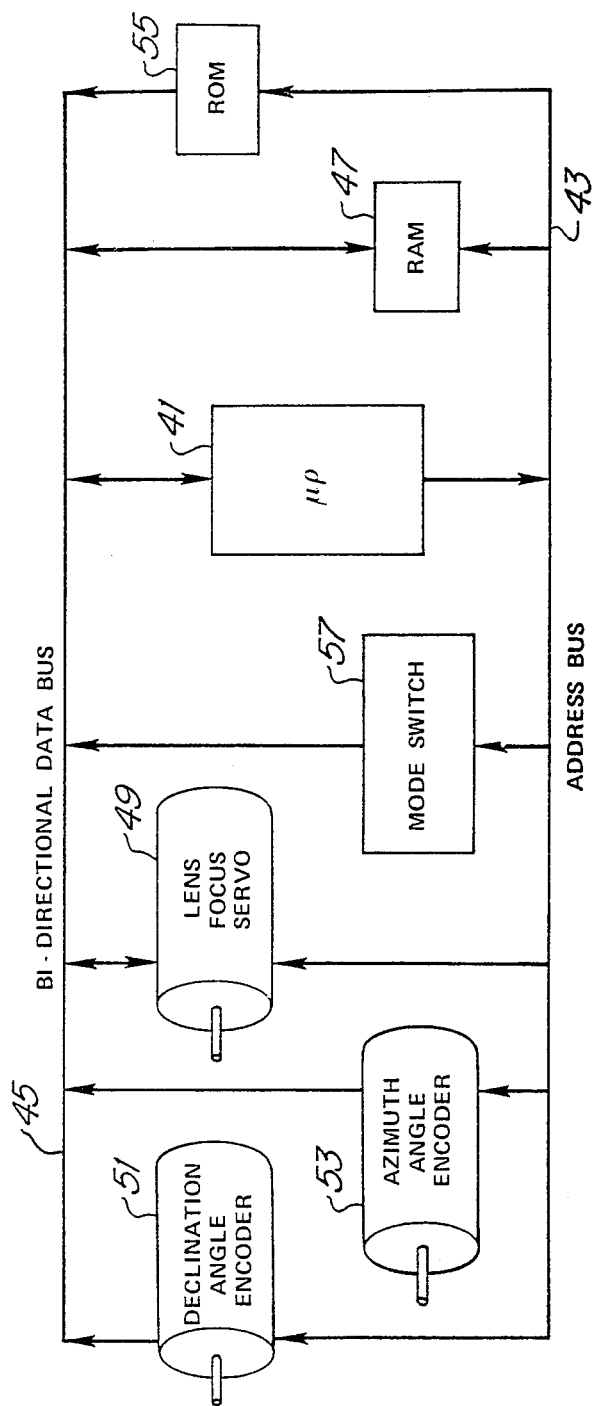
FIG. 3 is a block diagram of the autofocusing camera apparatus according to another embodiment of the present invention.

Referring now to FIG. 3, there is shown a simplified block diagram of microprocessor-based autofocusing apparatus. Using conventional computer bus architecture, the microprocessor 41 can communicate with other elements in the circuit by supplying its appropriate address over the address bus 43. The element so addressed may transmit data or instructions back to the microprocessor 41 via the bidirectional data bus 45. In the case of the random-access memory (RAM) 47 and the lens-focusing servo 49, data may also be sent from the microprocessor 41 to those elements via the same bus 45.

The two shaft-angle encoders 51, 53 are attached to the camera pivots for supplying camera-pointing information to the microprocessor 41. The lens-focusing servo 49 is coupled to the lens-focusing ring of a camera to move the lens in or out to the proper focus position as determined by the microprocessor 41. The lens-position-sensing encoded output of this servo is supplied to the microprocessor 41 via the data bus 45, upon a command from the microprocessor sent via the address bus 43. The program for controlling this operation is stored in read-only memory (ROM) 55. RAM 47 is used to store the learned focus settings corresponding to the associated pointing directions. The microprocessor 41 is used to interpolate between focus settings, as well as for over-all control. The clear/learn/run mode switch 57 is used by the operator to command the mode of operation via the microprocessor 41.

Figure 4:
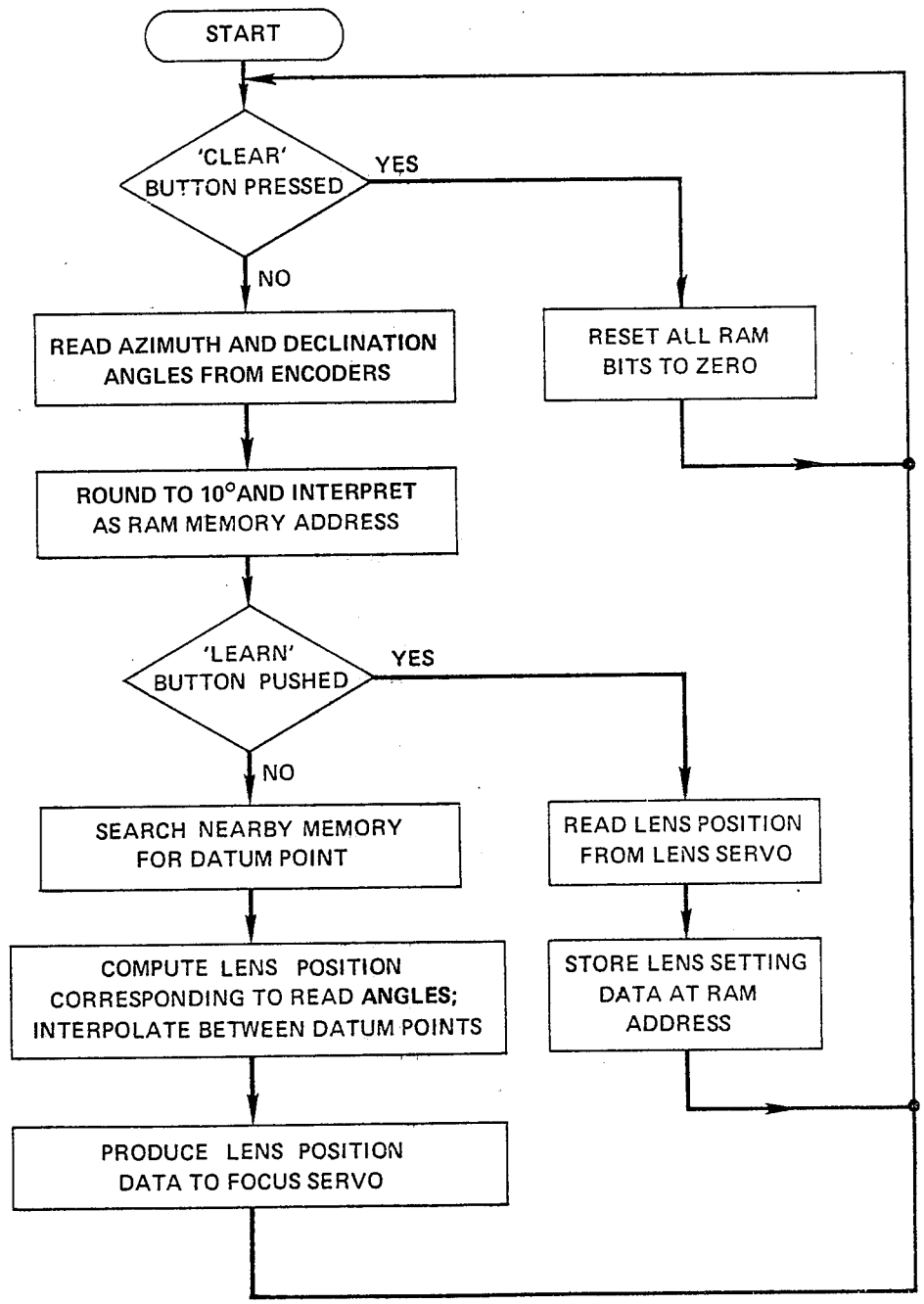
FIG. 4 is a flow chart of the apparatus of FIG. 3.

In operation, and with respect to the flow chart of FIG. 4, a cameraman first clears memory using the CLEAR position of mode switch 57. He then points the camera to the first point of interest, and focuses manually. By then setting the mode switch 57 to LEARN, the microprocessor 41 is commanded to store the first data points, namely, the desired focal setting from the position encoder of the lens servo 49, corresponding to the declination angle and azimuth angle data from encoders 51 and 53. The cameraman then proceeds in a similar manner at a number of points of interest and thereby builds a file of data in RAM 47.

To assure high operating speed while later recalling the data points, the RAM 47 can be organized as an X-Y matrix with each memory location corresponding to a pointing direction. For example, one memory location might correspond to the pointing direction of $20°\pm2\frac{1}{2}°$ declination, $+5°\pm2\frac{1}{2}°$ of azimuth. In that memory location there would then be stored the corresponding focus-setting data. All memory locations need not be filled, since the microprocessor 41 can linearly interpolate between data points and fill in the empty locations.

Figure 5:
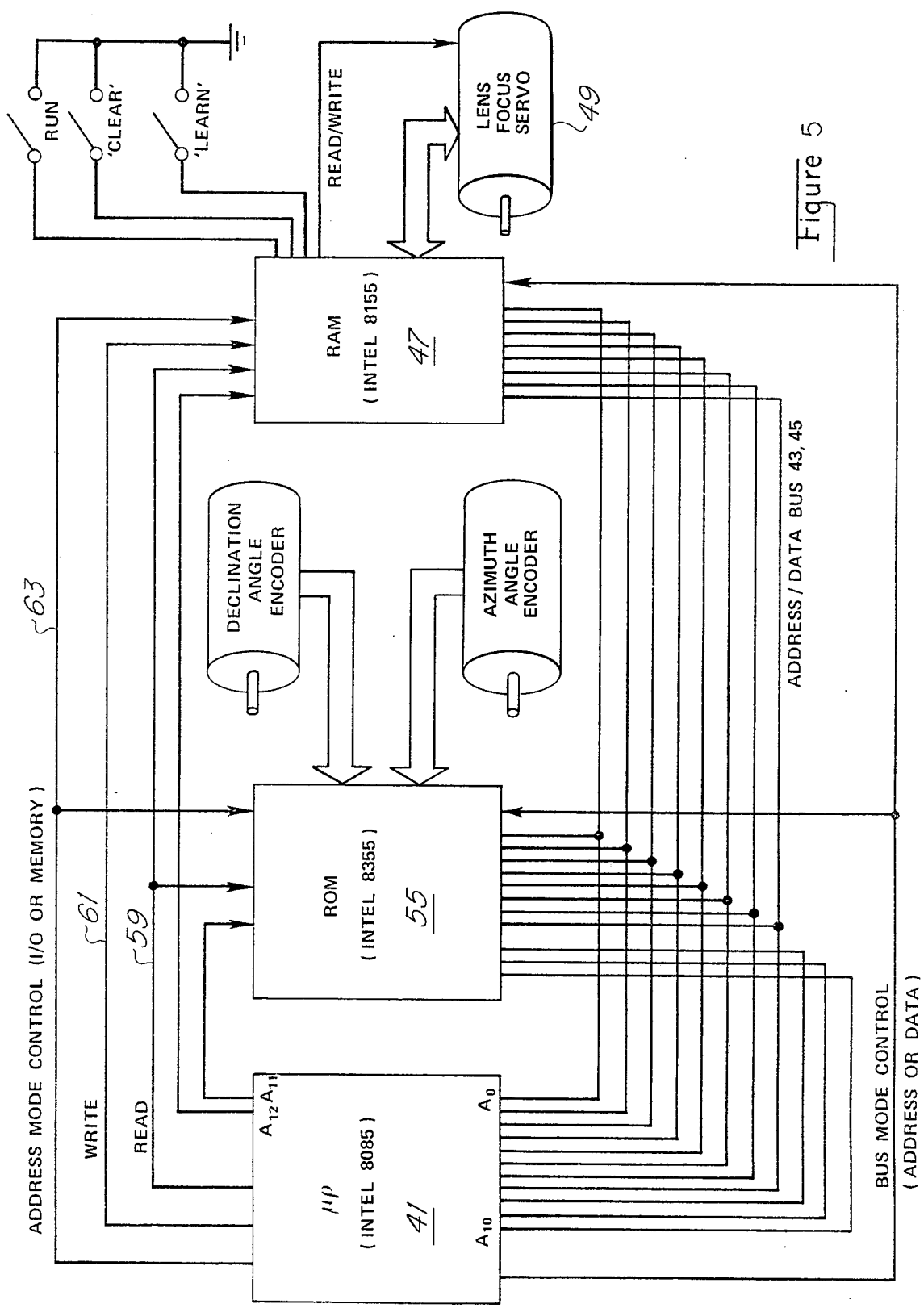
FIG. 5 is a detailed schematic diagram of the apparatus of FIG. 3.

To use the camera, the mode switch 57 is set to RUN. In this mode, the microprocessor 41 continually takes pointing information from encoders 51, 53 and the microprocessor 41 fetches from memory 47 the corresponding focus settings and supplies them via bus 45 to lens servo 49 to produce the desired automatic focus adjustment of the camera. This is facilitated by the focusing servo 49, as shown in the detailed schematic diagram of FIG. 5, which is responsive to binary input signals. It may comprise a conventional digital-to-analog converter coupled to a conventional analog servo, comprising a motor, a feedback potentiometer, and an operational amplifier.

This lens-focusing servo is controlled by the microprocessor 41 (e.g., INTEL Type 8085) which designates the origin or destination of data via the signals at the A11 and A12 address lines, the read 59 and write 61 lines, and the address mode control line 63. The A11 and A12 address lines specify whether data is passed via the ROM 55 or the RAM 47. The address mode control line 63 specifies whether the data is exchanged with the RAM 47 or the ROM 55, or via their data ports. Finally, the read and write lines 59, 61 allow the microprocessor 41 to specify whether it is receiving or supplying data.

If data is to be read from the ROM 55, the particular word in ROM to be read is specified by the address-/data bus 43, 45. Data words to be read from or written into RAM 47 are similarly specified as to location by the address sent over the same bus.

The RAM 47 may hold 256 eight-bit words. Each eight-bit word, if used, is a lens focus setting. Each of the 256 locations corresponds to a pointing direction, in 10-degrees increments. The 256 locations are interpreted as a 16-by-16 matrix of azimuth and declination angles. With 16 increments of each angle allowed, and with 10-degree intervals, pointing angles between ±75 degrees may be accommodated in both azimuth and declination.

Therefore, after the cameraman builds a file of focus data in RAM 47 in the manner previously described, and after the mode switch 57 of FIG. 3 has been operated through CLEAR and LEARN modes, the present apparatus reverts to the RUN mode. In a repetitive manner, it executes the algorithm shown by the flow chart of FIG. 4, continually sampling the pointing direction, rounding off to 10 degrees, looking up the focus setting in the table in memory, and providing the desired setting to the lens-focusing servo 49.

Figure 6:
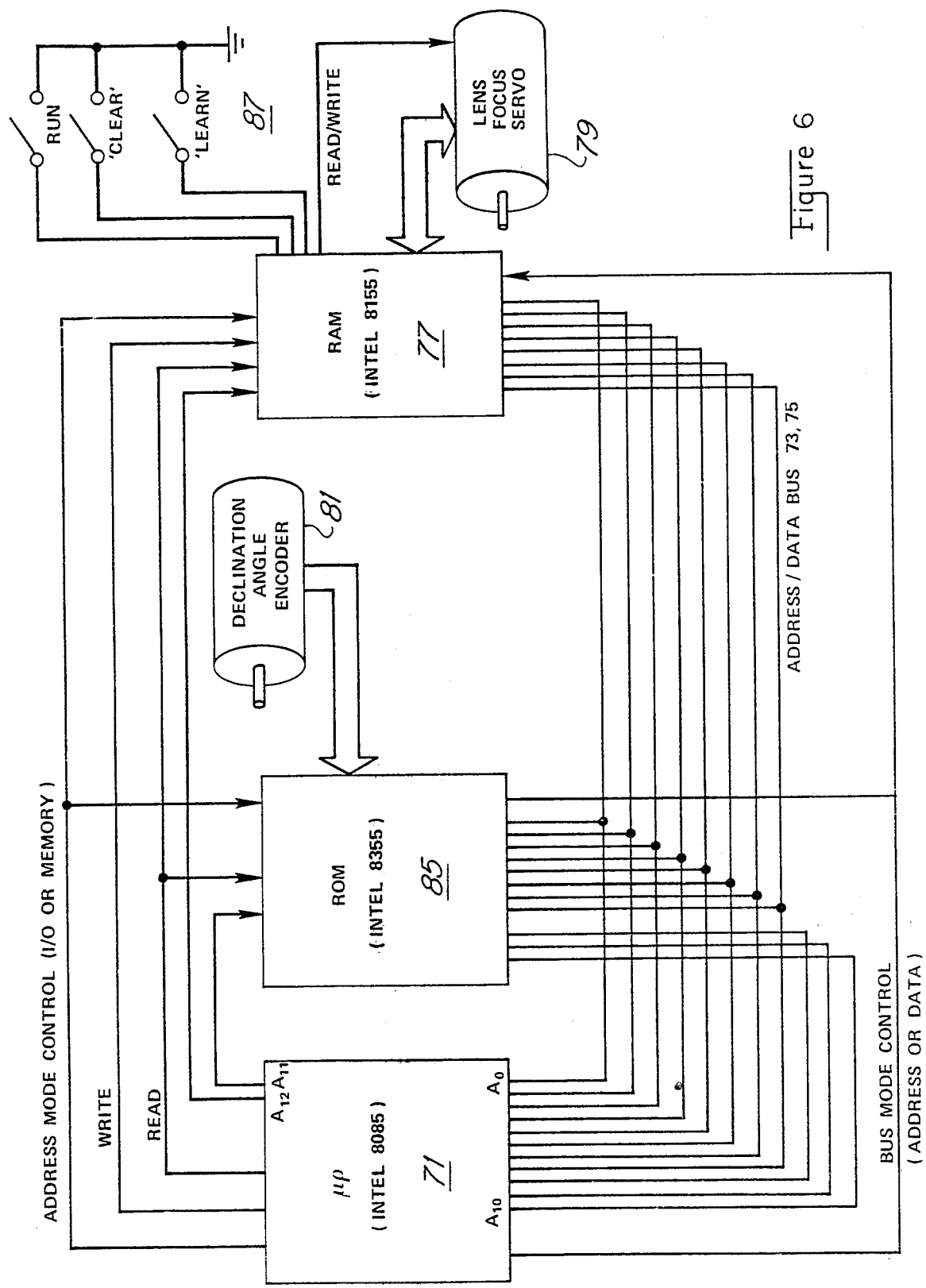
FIGS. 6 and 7 are schematic diagram and flow chart, respectively, of an embodiment for use above an object plane.
Figure 7:
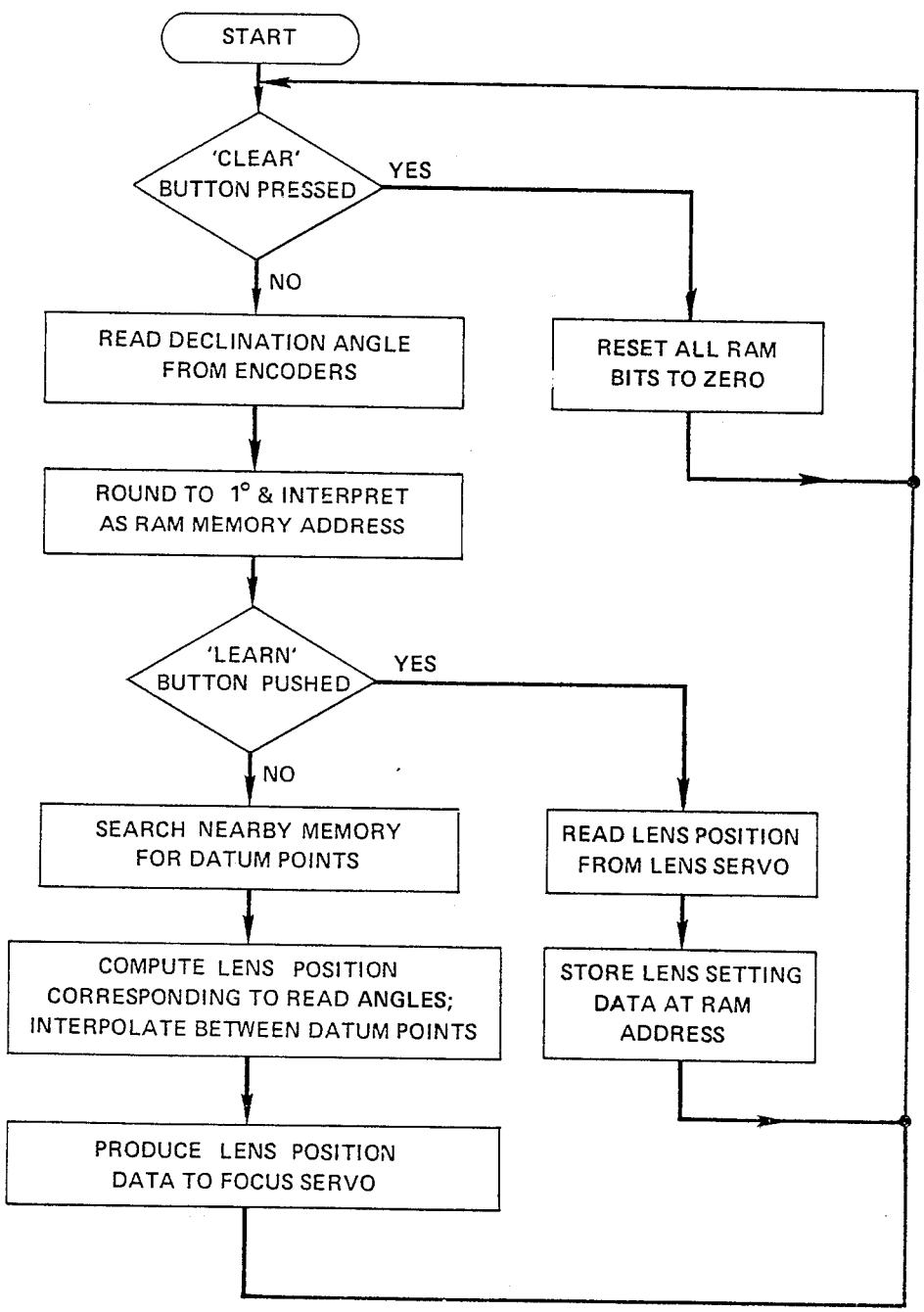

Referring now to the embodiment shown in FIGS. 6 and 7 for operation at an elevation above an object plane, the focusing information is stored for each angular declination of the lens as data contained in a look-up table of values of lens position corresponding to each such declination angle. The table may be generated on-site before an event by pointing the camera at various points in the plane of the event, focusing at each point manually (or by other means not a part of this invention such as by split-image focusing, laser ranging, and the like), and by electronically storing the resulting data. In use, then, the lens-shift data corresponding to the declination angle in which the camera is currently pointed is derived from the look-up table and may even be interpolated if desired between stored data points. In this embodiment, an angle transducer is disposed to measure the declination angle of the camera, and an electronic controller such as a microprocessor and a lens-focusing servo are arranged to reposition the lens for proper focus as the camera tracks an object in the plane at a declination angle previously sensed and from which the focusing data therefore was previously derived.

More specifically, the embodiment illustrated in the simplified diagram of FIG. 6 and flow chart of FIG. 7 uses a conventional computer bus architecture so that the microprocessor 71 can communicate with other elements in the circuit by supplying its appropriate address over the address bus 73. The element so addressed may transmit data or instructions back to the microprocessor 71 via the bidirectional data bus 75. In the case of the random-access memory (RAM) 77 and the lens-focusing servo 79, data may also be sent from the microprocessor 71 to those elements via the same bus 75.

The shaft-angle encoder 81 is attached between the camera and a level reference, such as a tripod mount or a gyrostabilized artificial horizon unit for supplying camera-declination information to the microprocessor 71. The lens-focusing servo 79 is coupled to the lens-focusing ring of a camera to move the lens in or out to the proper focus position as determined by the microprocessor 71. The lens-position-sensing encoded output of this servo is supplied to the microprocessor 71 via the data bus 75, upon a command from the microprocessor sent via the address bus 73. The program for controlling this operation is stored in read-only memory (ROM) 85. RAM 77 is used to store the learned focus settings corresponding to the associated declination angles. The microprocessor 71 may be operated to interpolate between focus settings, as well as for over-all control. The clear/learn/run mode switch 87 is used by the operator to command the mode of operation via the microprocessor 71.

In operation, and with respect to the flow chart of FIG. 7, a cameraman first clears memory using the CLEAR position of mode switch 87. He then points the camera to the first point on the object plane, and focuses manually or by other conventional automated means. By setting the mode switch 87 to LEARN, the microprocessor 71 is commanded to store the first data points, namely, the desired lens position or focal setting from the lens-position encoder 86 corresponding to the declination angle data from encoder 81. The cameraman then proceeds in a similar manner at a number of points of interest and thereby builds a file of data in RAM 77.

To assure high operating speed while later recalling the data points, the RAM 77 may be organized as a linear array with each memory location corresponding to a pointing direction. For example, one memory location might correspond to the pointing direction of $20°±\frac{1}{2}°$ declination. In that memory location there would then be stored the corresponding lens position or focus-setting data. All memory locations need not be filled, since the microprocessor 71 can linearly inerpolate between data points and fill in the empty locations.

To use the camera, the mode switch 87 is set to RUN. In this mode, the microprocessor 71 continually takes pointing information from encoder 81 and fetches from memory 77 the corresponding lens-position or focus setting and supplies it via bus 75 to lens servo 79 which may be operated in the manner previously described to reposition the lens to the same desired focus adjustment of the camera for that declination angle.

On advantage of this embodiment is that systematic errors, for example, attributable to angle sensor inaccuracies, are removed. If such sensors are merely repeatable though inaccurate, then the stored information therefrom for a given lens setting at a certain declination angle will nevertheless assure proper repositioning of the lens to the same setting when recalled from storage for the same declination angle. This embodiment of the present invention thus provides self-focusing adjustment for a camera simply in response to the angle of declination.

I claim:

1. Camera focusing apparatus for a camera having an adjustable-focus lens operated from a position above a horizontal object plane, the apparatus comprising:
   mounting means disposed to support the camera for altering the pointing direction thereof at least in a vertical plane;
   angle-sensing means coupled to the camera for producing an output representative of the camera-pointing direction within a vertical plane with respect to level orientation of the camera;
   scaling means for altering said output by a constant of proportionality to provide an altered output which is representative of the height of the camera above the object plane; and
   actuating means for converting said altered output to focus-adjusting motion of the lens of the camera.

2. Camera focusing apparatus as in claim 1 wherein said angle-sensing means produces an output substantially proportional to the angle of the camera-pointing direction relative to the level orientation thereof and within a vertical plane for small angles less than a selected value.

3. Camera focusing apparatus as in claim 1 wheren said angle-sensing means produces an output substantially proportional to the sine of the angle of the camera-pointing direction relative to the level orientation thereof and within a vertical plane.

4. Camera focusing apparatus as in claim 1 wherein angle-sensing means produces said output relative to an artificial horizon.

5. Camera focusing apparatus as in claim 1 wherein said scaling means includes lens-position sensing means adapted to produce an output indicative of lens position, storage means for storing outputs indicative of lens positions corresponding to declination angles of the camera, and circuit means coupled to said storage means and operable in one mode for storing the outputs indicative of lens positions corresponding to selected declination angles, and also operable in a second mode for recalling said outputs from said storage means corresponding to selected declination angles for supplying said recalled outputs to said actuating means to position the camera lens for proper focus at the corresponding declination angle.

* * * * *